Patented May 1, 1923.

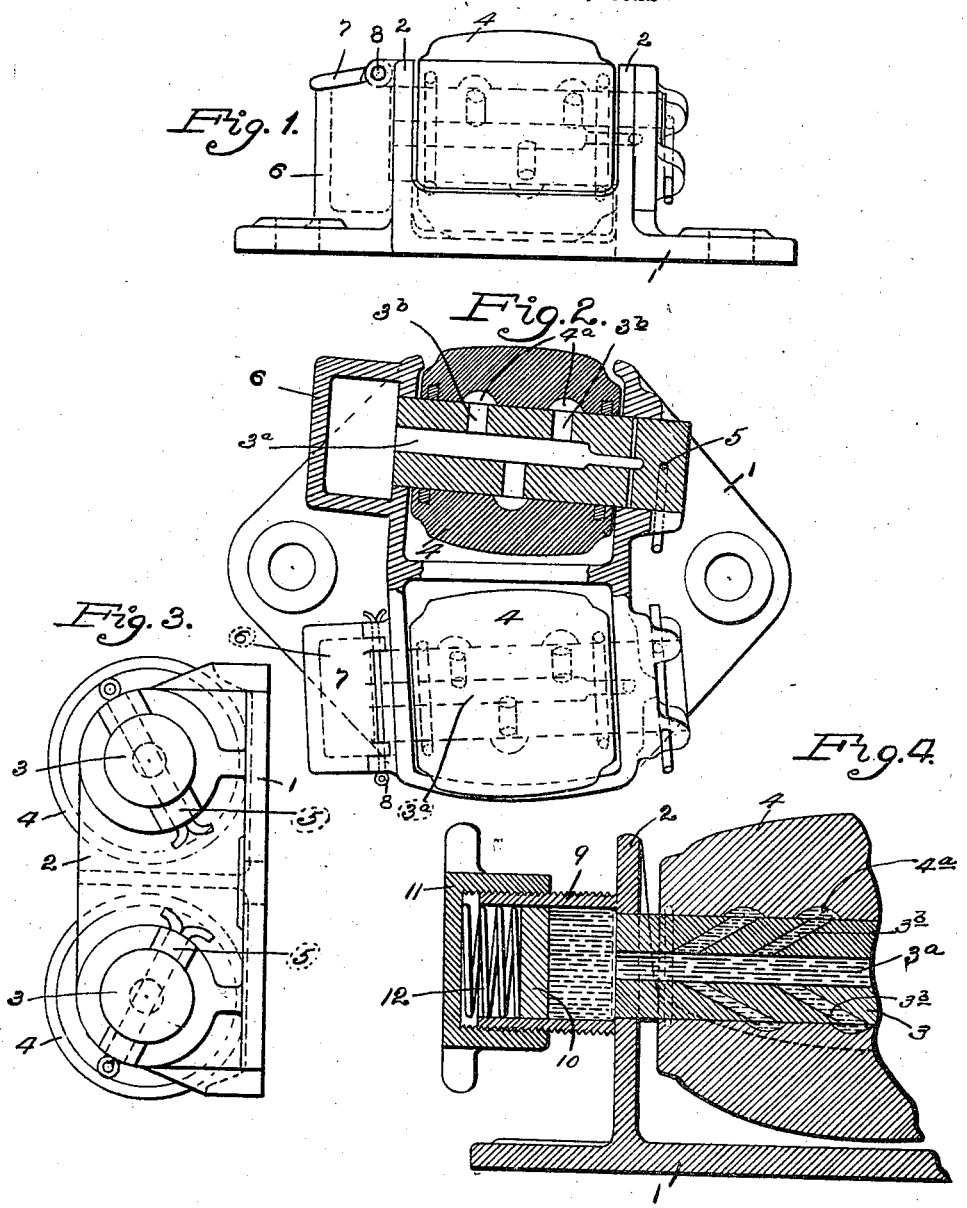

1,453,700

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

LUBRICATED ROLLER SIDE BEARING.

Application filed February 27, 1922. Serial No. 539,479.

*To all whom it may concern:*

Be it known that I, EDWIN G. BUSSE, a citizen of the United States, residing at the city of Chicago, county of Cook, and State of Illinois, have invented a certain new and useful Improvement in Lubricated Roller Side Bearings, of which the following is a full, clear, and exact description, such as will enable others skilled in the art to which it appertains to make and use the same, reference being had to the accompanying drawings, forming part of this application, in which—

Figure 1 is a side elevational view of my improved roller side bearing.

Figure 2 is a top plan view of the same partially in section.

Figure 3 is an end elevational view, and

Figure 4 is a side elevational view partly in section illustrating a modified form.

This invention relates to a new and useful improvement in lubricated side roller bearings, the object being to construct a device of the character described, which is simple and efficient and one in which the lubricating charge may be renewed without dismantling the bearing.

My present invention is designed as an improvement upon the type of bearing shown in the patent to Ernest A. Le Beau, No. 1,106,824, dated August 11, 1914.

In the drawings, 1 indicates the base plate of a roller side bearing, in this instance, shown as the bottom bearing, i. e., one which is designed to be mounted upon the truck or truck bolster of a railway car. This bearing is provided with upwardly extending walls 2 apertured to receive a shaft or roller pin 3.

4 is the roller bearing arranged on pin 3 and between the walls 2. Pin 3 is prevented from longitudinal movement by means of cotter pin 5. One of the walls 2 is provided with a grease cup, or cups, 6 open at its upper end and through which opening access may be gained to the interior of the cup, said open end being closed by a gravity lid 7 preferably held in position by means of a cotter pin 8.

Pin 3 is shown in Figure 2 as provided with a central bore 3ª open at one end into grease cup 6, said central bore being provided with lateral ports 3ᵇ, which communicate with the bearing surfaces of the pin, and with oil grooves 4ª in the roller.

In operation, grease cup 6 is preferably filled with waste and charged with a lubricant. The lubricant seeps through the ports 3ª and 3ᵇ so as to lubricate the roller. When it is necessary to recharge the grease cup with the lubricant, it is only necessary to lift the lid 7, and hence recharging may be accomplished without dismantling the roller bearing.

In Figure 4, I have shown a modified form in which one of the walls 2 is provided with a threaded extension 9 constituting a lubricating chamber in which is arranged a spring follower 10 in the form of a piston.

11 is a cap threaded on the boss 9, which cap when screwed inwardly, exerts pressure upon coiled spring 12 bearing against the piston 10, whereby energy is exerted upon said piston to force lubricant into the roller pin ports, thus lubricating the roller as before described.

While I have mentioned the grease cap 6 as being preferably filled with waste, it is obvious that waste need not be employed.

What I claim is:

1. A lubricated roller bearing comprising a support, a ported roller pin mounted therein, a roller bearing on said pin and having a plurality of grooves in its bore registering with oppositely disposed ports in said pin, and an externally arranged lubricating chamber in direct communication with the ports of said roller pin.

2. In a bearing, the combination of supports, a ported roller pin mounted in said supports, a side bearing roller rotatably mounted on said pin, an externally arranged lubricant chamber formed integral with said support at one end of, and in axial alinement with, said pin and in communication with the ports of said roller pin, and a closure for said chamber.

3. In a roller side bearing, the combination of a support, a ported roller pin in said support, a roller mounted on said pin, a lubricating chamber, the walls of which are integral with said support, a combined piston and spring seat follower in said lubricating chamber, an adjustable cap for closing said chamber, and a spring interposed between said cap and said piston-spring seat follower.

In testimony whereof I hereunto affix my signature this 17th day of February, 1922.

EDWIN G. BUSSE.